| (12) | United States Patent | (10) Patent No.: | US 6,920,143 B1 |
|---|---|---|---|
| | Ortiz et al. | (45) Date of Patent: | Jul. 19, 2005 |

(54) COMPUTER TELEPHONY SYSTEM USING MULTIPLE HARDWARE PLATFORMS TO PROVIDE TELEPHONY SERVICES

(75) Inventors: Luis Ortiz, Hyde Park, MA (US); Kevin J. Cassidy, Stow, MA (US)

(73) Assignee: Brooktrout, Inc., Needham, MA (US)

( * ) Notice: Subject to any disclaimer, the term of this patent is extended or adjusted under 35 U.S.C. 154(b) by 0 days.

(21) Appl. No.: 09/267,178

(22) Filed: Mar. 12, 1999

Related U.S. Application Data

(63) Continuation-in-part of application No. 09/260,299, filed on Mar. 2, 1999, now abandoned.
(60) Provisional application No. 60/077,793, filed on Mar. 12, 1998.

(51) Int. Cl.[7] .......................... H04L 12/28; H04L 12/56
(52) U.S. Cl. ...................... 370/401; 370/389; 370/392; 370/396
(58) Field of Search ........................ 370/352, 353–356, 370/493; 379/90.01, 198

(56) References Cited

U.S. PATENT DOCUMENTS

| 5,293,379 | A | * | 3/1994 | Carr | 370/474 |
| 5,426,643 | A | * | 6/1995 | Smolinske et al. | 370/506 |
| 5,488,651 | A | | 1/1996 | Giler et al. | 379/100.14 |
| 5,960,201 | A | * | 9/1999 | Ma et al. | 717/154 |
| 6,064,671 | A | * | 5/2000 | Killian | 370/389 |
| 6,088,365 | A | * | 7/2000 | Kurdzo et al. | 370/466 |
| 6,108,307 | A | * | 8/2000 | McConnell et al. | 370/235 |
| 6,205,135 | B1 | * | 3/2001 | Chinni et al. | 370/356 |
| 6,263,393 | B1 | * | 7/2001 | Funaya et al. | 710/316 |
| 6,298,063 | B1 | * | 10/2001 | Coile et al. | 370/401 |
| 6,343,086 | B1 | * | 1/2002 | Katz et al. | 370/352 |
| 6,366,656 | B1 | * | 4/2002 | Lee et al. | 379/198 |
| 6,411,621 | B1 | * | 6/2002 | Norton et al. | 370/394 |
| 6,587,473 | B2 | * | 7/2003 | Terry et al. | 370/445 |

OTHER PUBLICATIONS

Halsall, Data Communications, 1996, Addison–Wesley, 4th Edition, p. 651.*

* cited by examiner

*Primary Examiner*—Chi Pham
*Assistant Examiner*—Ronald Abelson
(74) *Attorney, Agent, or Firm*—Fish & Richardson P.C.

(57) ABSTRACT

A computer telephony system includes a multi-platform architecture that provides a layer of abstraction between application software and hardware associated with a platform. According to this architecture, service modules residing on different platforms access computer telephony resources to facilitate performance of a variety of computer telephony services. Although local access to such resources is governed by diverse, platform-dependent protocols, the service modules communicate with one another according to a common, platform-independent protocol. In this manner, cross-platform communication is abstracted to isolate system software and firmware from hardware-based platform dependencies. Instead of threaded drivers creating a persistent, dedicated link with resources, communication can be accomplished via a common, platform-independent message packet protocol.

30 Claims, 5 Drawing Sheets

COMPUTER TELEPHONY SYSTEM USING MULTIPLE HARDWARE PLATFORMS TO PROVIDE TELEPHONY SERVICES

This is a continuation-in-part of U.S. patent application Ser. No 09/260,299, to Ortiz et al., filed Mar. 2, 1999, abandoned Sep. 27, 2002. Priority is claimed from U.S. patent application Ser. No. 09/260,299 and U.S. Provisional Application Ser. No. 60/077,793, filed Mar. 12, 1998, the provisional application expired.

TECHNICAL FIELD

This invention relates to computer telephony systems that use multiple hardware platforms to provide telephony services.

BACKGROUND INFORMATION

Computer telephony (CT) systems manage the flow of electronic messages. Such messages include voice, data, and facsimile information, as well as video and other multi-media information. Computer telephony systems receive messages via the public telephone network or a private enterprise network, and may make use of POTS, IP, and wireless telephony technology. Computer telephony systems provide an array of telephony services.

To deliver services that can handle fax, voice, and data messaging, and video and other multi-media messages, computer telephony systems use multiple hardware platforms along with threaded proprietary software drivers and application program interfaces (APIs) that exploit the functions of the platforms. Development of applications sometimes does not keep pace with evolving market requirements and new hardware capabilities. Application development may require management of incompatibilities among platforms and development tools, and reliance on multiple vendors.

Due to the lag in application development, required capabilities may not be available when the user desires them. New hardware advances may be deployed without regard to the extensibility of existing firmware. Instead, firmware may be bound to specific hardware. Consequently, existing messaging systems and applications may be rendered obsolete by new hardware platforms. The time and cost of application and firmware redevelopment can undermine the price and performance gains of the new hardware.

SUMMARY

This invention pertains to a computer telephony system having a multi-platform architecture capable of delivering a high degree of scaleability, extensibility, portability, and configurability. The architecture provides a layer of abstraction between the application software and hardware associated with each platform. The architecture is useful in delivering a variety of computer telephony services including voice, data, and fax services, as well as video and other multi-media services. Also, the architecture can be used with different computer telephony platforms including POTS, IP, and wireless telephony. The flexibility of such a system facilitates delivery of a wide range of services over a wide range of platforms.

In one aspect, the invention provides a service module for use in a computer telephony system having a plurality of computer telephony platforms. The service module manipulates a resource residing on one of the platforms according to a platform-dependent protocol to facilitate performance of computer telephony services by the resource for another service module. The service module communicates with other service modules according to a common, platform-independent protocol.

In another aspect, the invention provides a computer telephony system comprising computer telephony platforms and service modules residing on the platforms. The service modules access resources on the platform to facilitate performance of computer telephony services for other service modules. Communication among the service modules uses message packets communicated according to a common, platform-independent protocol.

In another aspect, the invention provides a computer telephony system including computer telephony platforms having resources that provide computer telephony services. Service modules residing on each of the platforms manipulate the resources according to platform-dependent protocols to facilitate performance of the computer telephony services for other service modules. Communication among the service modules uses message packets having a common, platform-independent protocol. Intra-platform packet routers residing on the platforms are configured to route message packets having intra-platform destination addresses to local service modules, and route message packets having inter-platform destination addresses to an inter-platform interface. An inter-platform packet router associated with the inter-platform interface routes message packets having inter-platform destination addresses received from the intra-platform routers to one of the intra-platform routers residing on one of the platforms on which the service modules indicated-by the inter-platform address reside.

In another aspect, the invention provides a method for communicating service requests among service modules in a computer telephony system having a plurality of computer telephony platforms. Each of the computer telephony platforms provides a resource that performs an computer telephony service. The method includes the steps of communicating service requests among the service modules according to a common, platform-independent protocol, and controlling the service modules with the service requests to manipulate the resources according to platform-dependent protocols to facilitate performance of the computer telephony services.

In another aspect, the invention provides a method for multi-platform communication in a computer telephony system having a plurality of computer telephony platforms providing resources. The resources facilitate the performance of computer telephony services. Service modules residing on the platforms are configured to manipulate the resources according to one of a plurality of platform-dependent protocols to perform the computer telephony services for other service modules. The method includes the steps of communicating information between each of the service modules via message packets having a common, platform-independent protocol, each of the message packets including a destination address indicating one of the service modules to receive the message packet, routing each of the message packets having an intra-platform address to an appropriate service module on the platform, and routing each of the message packets having inter-platform addresses to one of the platforms on which the service modules indicated by the inter-platform address reside.

The invention can provide a number of advantages. For example, service modules residing on different hardware platforms can access computer telephony resources to facilitate performance of a variety of computer telephony services. Although local access to such resources may be governed by diverse, platform-dependent protocols, the service modules communicate with one another according to a common, platform-independent protocol. In this manner, cross-platform communication is abstracted to isolate system software and firmware from hardware-based platform changes. Thus, software and firmware development can proceed on separate paths from hardware development without the need for significant coordination.

Instead of threaded drivers creating a persistent, dedicated link with resources, communication can be accomplished via a common, platform-independent packet switching protocol. Intra-platform packet routers operate according to the packet switching protocol and allow function parameters to be abstracted for manipulation via a common set of commands. Also, the packet protocol provides flexibility, enabling different processes to address the same resource simultaneously via packet switching.

Packet routers and service modules can be made highly modular and portable to allow extensibility of functions, independence from operating systems, and abstraction from hardware. The packet routers and service modules can be ported across diverse platforms without significant redevelopment. In particular, the packet routers can be coded once for all platforms. In addition, the service modules can be interchanged as appropriate for different platform resources. As a new resource becomes available, for example, a service module can be developed with appropriate low-level capabilities, and effectively added to the system in a modular manner.

Communication between firmware and various software layers on the host, including the driver and API, can be performed using data packets similar to packet switched networks. Packets abstract low-level commands and data types as "payloads" and offer the highest level of data communication flexibility. A core driver can be configured to perform packet-switching and will provide seamless support of multiple application processes including management processes such as SNMP agents. In contrast to the traditional, hardware-centric, threaded driver, a packet switched paradigm for driver communications provides greater flexibility. In particular, it enables multiple processes, such as an application and a management agent, to address the same port simultaneously. Parameters are passed within a data structure between the application and the called functions as opposed to the traditional method of using an argument list. This allows function parameters to be abstracted.

All software can be developed in a language such as C, which provides a high level of portability between processors. Firmware that provides the media processing, network, and call control functions on the messaging platform includes highly modular firmware facilities. Facilities are software modules that govern a very specific task such as G.721 voice coding, V.34, full duplex modulation, T.30 protocol processing or image resolution scaling. API libraries and drivers include modular components which allow extensibility of functions, independence from operating systems and abstraction from hardware.

The modularity of software can be extended to the use of hardware and physical layer abstraction. Modules at the lower levels of software provide hardware and physical layer abstraction to make specific hardware components and physical layer interfaces transparent to most of the software and firmware. The architecture can deliver software components that take the form of development tools, application programming interfaces and drivers on the host PC and firmware which performs modulation, media processing, and call control on an add-in board messaging platform utilizing both DSP and scalar processors, e.g., RISC or CISC.

This architecture can support a universal port environment, and supports a choice of development environments in order to protect investment in application code and simplify application development. Also, the architecture can support portable and configurable firmware components, enabling highly cost-effective platforms for the functions and scale of the application. All development tools and messaging platforms provided under the architecture can be made inherently universal port and thus enable fax, voice and data messaging, as well as video and other multi-media services. This provides developers with a unified approach to the development and deployment of computer telephony systems and services. This universal port approach also supports circuit and packet switched network connection with physical layer abstraction. This simplifies the development of applications by abstracting physical and other lower layer nuances of the various call control methods and network protocols. For example, a developer creating a unified fax and voice messaging application must only utilize a single universal port API for access to all fax, voice and call control capabilities. Further, basic call control functions are abstracted from underlying physical layer interfaces such as analog loop start, direct inward dial, T1, or ISDN.

Platforms based on such an architecture can utilize a range of development tools that support multiple development paradigms such as C callable API libraries and graphical, object orientated rapid application development tools. The use of structured parameter passing allows applications to migrate forward into the future with only minimal modifications necessary to add new capabilities. Debugging tools and reporting mechanisms, enabled by a packet-based communications mechanism, can inspect data at multiple layers, providing developers with an effective means to deliver reliable applications. By providing a proprietary API as part of the architecture, applications developed for different platforms can be easily migrated through recompilation to other platforms, thereby protecting investment in existing applications. For developers creating new applications, who wish to take a vendor-independent approach, an industry standard API can be provided with the architecture. An example of an industry standard API is the Enterprise Computer Telephony Forum (ECTF) S.100 standard. The S.100 API provides a common application programming interface for multiple vendors' platforms, which delivers an investment protection benefit by providing vendor independence.

The needs of computer telephony system and service providers differ based on their own competitive positioning and constant evolution in the market. An architecture as described herein enables messaging platforms that utilize firmware to deliver a specific set of capabilities required by the developer. The software architecture, through modular firmware facilities and packet-based communications interfaces, allows delivery of multiple firmware configurations and fast turn-around of extensions to those configurations. For example, an enhanced fax services provider may wish to upgrade its systems from V.17 to V.34 modulation to take advantage of the increase in the installed base of V.34 fax machines. Also, a PBX manufacturer may require a specific voice coding algorithm to deliver voice calls over its customers' private wide area networks. In either case, the ability to quickly deliver new capabilities through specific firmware configurations is advantageous in meeting the various needs of the computer telephony developer.

Advances in processor and integrated circuit technology enable greater levels of messaging port density at a lower cost. The challenge is to quickly deliver new messaging platforms based on those technologies. Designing new board platforms which utilize faster, cheaper processors can often be accomplished before the new devices are in production. However, porting software and firmware to the new board platform is almost always in the critical path to delivering the new platform. Software and firmware components written in a portable language, e.g., C, with hardware abstraction layers enable faster porting to a constantly evolving choice of processors with varying performance and cost characteristics. These components in turn, enable the delivery of cost-effective board-level platforms that meet the function and density requirements of various applications. Board-level platforms in ISA, PCI or CompactPCI form factors with MVIP, SCbus or H.100 telephony bus interfaces may meet various requirements for system level hardware integration. These platforms can support scaleability from two ports to as many as 672 ports, in the case of DS3 or OC3.

Other advantages, features, and embodiments of the present invention will become apparent from the following detailed description and claims.

DESCRIPTION OF THE DRAWINGS

Like reference numbers and designations in the various drawings indicate like elements.

DETAILED DESCRIPTION

Figure 1:
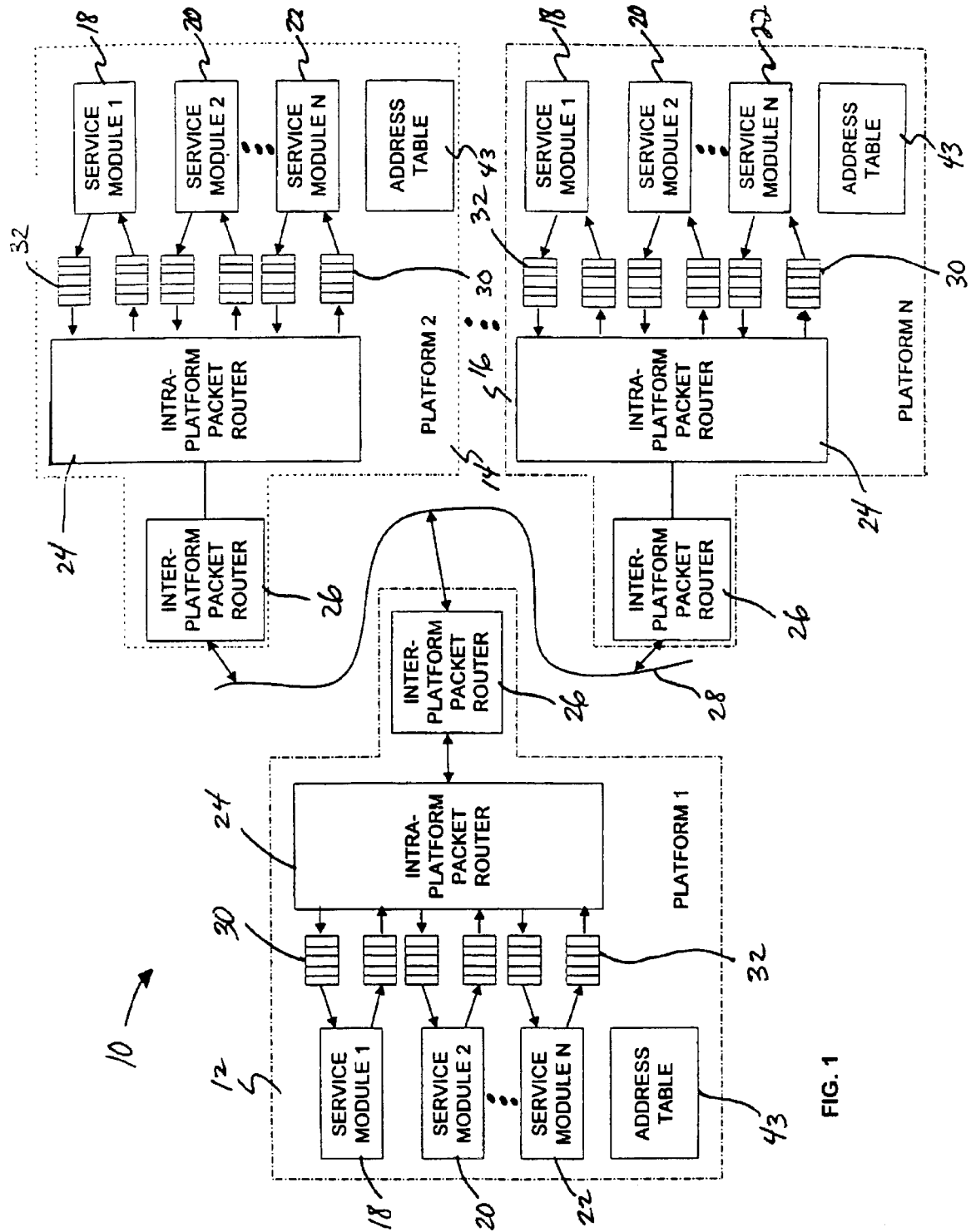
FIG. 1 is a functional block diagram of a computer telephony system having a multi-platform architecture.

FIG. 1 is a functional block diagram of a computer telephony system 10 having a multi-platform architecture. As shown in FIG. 1, computer telephony system 10 includes computer telephony platforms 12, 14, 16. Each platform 12, 14, 16 includes service modules 18, 20, 22, an intra-platform packet router 24, an inter-platform packet router 26, and a processor and associated hardware and software for implementing modules 18, 20, 22, router 24, and router 26. Platforms 12, 14, 16 comprise computer workstations, hardware components controlled by a common processor, or systems integrating both.

Platforms 12, 14, 16 may be scalable to include additional service modules. Service modules 18, 20, 22 communicate with a platform processor via a host bus, e.g., ISA, PCI, or VME. In some cases, service modules 18, 20, 22 on a common platform may communicate with one another via private board interconnects. Platforms 12, 14, 16 are dynamically interconnected for communication with one another via an inter-platform interface 28 serving inter-platform packet routers 26. The inter-platform interface 28 can be based on known network architectures, e.g., Ethernet, TCP/IP, or ATM, or known inter-processor system architectures, e.g., PCI.

Platforms 12, 14, 16 implement platform resources that perform a variety of computer telephony services. Each resource comprises a hardware and/or software module configured to perform a computer telephony service. Examples of services are voice coding, dual-tone multi-frequency (DTMF), call progress, data modem, image transformation, and fax modem services. For some services, a resource is realized primarily by a hardware device. A voice recognition resource may require a circuit board with a digital signal processor. A resource may be a software application running on the platform host processor or on a processor on a board associated with the resource. For example, a facsimile resource may include a software application running on the host processor. A resource, in many cases, will combine hardware and software modules. In either case, the resource operates according to a platform-dependent protocol. In other words, each resource accepts and generates a unique set of commands and data structures in performing a computer telephony service and, consequently, requires platform-dependent drivers and firmware, if applicable.

Each service module 18, 20, 22 comprises a software module that runs on the platform host processor or as firmware on a board associated with a particular hardware resource. A service module 18, 20, 22 performs a function or group of functions under the control of a common state machine. In particular, a service module 18, 20, 22 performs those functions necessary to manipulate, or drive, a respective resource to facilitate performance of one of the computer telephony services. System 10 is a distributed processing system in which applications require access to resources on multiple platforms. Each service module 18, 20, 22 acts as a server for other client service modules. Thus, a service module may drive a resource to service one of the other service modules. In other words, each service module 18, 20, 22 initiates the performance of a requested service by the resource and obtains any results for communication to either the requesting service module or another service module necessary to complete the requested service. To access a respective resource, each service module 18, 20, 22 is configured to communicate with that resource via a platform-dependent protocol. In addition to operating system-dependent aspects, the platform-dependent protocol may include commands and data structures appropriate for the particular resource. However, service modules 18, 20, 22 accept and generate messages for both intra- and inter-platform communication with other service modules according to a platform-independent protocol. In this manner, client service modules can be isolated from the internal function and structure of particular resources. Consequently, service modules can continue to communicate with one another despite underlying platform changes without significant redevelopment at the inter-platform interface level.

To handle the platform dependencies of a particular resource, each service module 18, 20, 22 is uniquely coded for the resource. For example, each service module 18, 20, 22 may have a platform-dependent interface to the resource that is defined by a set of operational states and transitions, a list of events, commands, and a set of data formats appropriate for the resource. Some service modules 18, 20, 22 also may include other platform-dependent interfaces. For example, a firmware service module running on a board may contain digital signal processing (DSP) assembly code that performs processing of voice data in real time, or interfaces to a modem chip. Service modules 18, 20, 22 running on the host platform processor also may be configured to receive requests directly from an application or the host operating system. Further, in some cases, a software module recognized as a service module may not include a platform-dependent interface to a resource. Instead, some service modules may communicate with other service modules to perform some data operation or act as a macro expander and send commands to another service module. In such a case, the software module operates as a service module but does not access a resource, and therefore does not require a platform-dependent interface. Instead, this type of service module is configured with only a platform-independent interface for communication with other service modules.

In addition to handling platform and resource dependencies, service modules 18, 20, 22 are configured to communicate with the other service modules via message packets having a common, platform-independent protocol. With further reference to FIG. 1, each service module 18, 20, 22 includes a set of queues 30, 32 for processing incoming and outgoing message packets. As will be explained, intra- and inter-platform packet routers 24, 26 provide system 10 with a packet-switching paradigm in which message packets are routed to service modules associated with appropriate resources without the need for persistent links.

Figure 2:
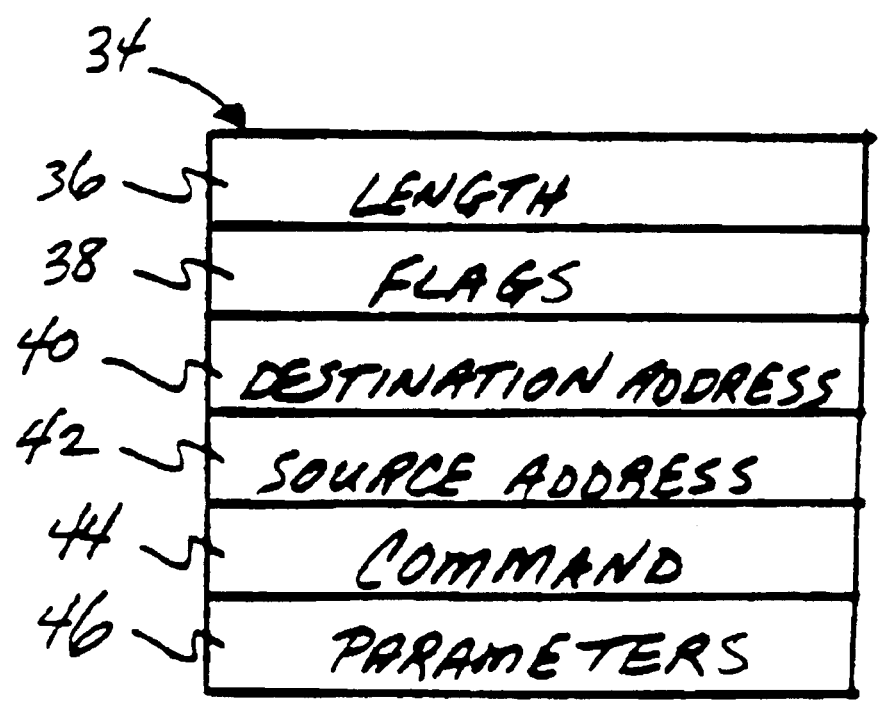
FIG. 2 is a diagram illustrating a message packet protocol used by the system of FIG. 1.

FIG. 2 is a diagram illustrating an exemplary protocol for a message packet 40 used by system 10 for communication between service modules 18, 20, 22. As shown in FIG. 2, message packet 34 includes a length field 36, flags field 38, destination address 40, source address 42, command field 44, and parameters field 46. Length field 36 designates a length of the message packet and ensuing command blocks, whereas flags field 38 provides an indication of the relative priority of the message. The destination address 40, source address 42, command field 44, and parameters field 46 may be repeated for successive, multiple command blocks provided with a given message.

Destination address 40 indicates an address of one of the service modules 18, 20, 22 to receive the respective message packet. The designated service module is identified based on the particular resource with which it is associated. Source address 42 indicates an address of one of the service modules originating the respective message packet. Finally, command field 44 includes one or more of a set of commands common to each of the message packets, and parameter field 46 includes one or more of a set of parameters. The address fields 40, 42 preferably are made somewhat abstract to allow message packets to be routed through the system in a consistent manner regardless of the communication mechanism being used. In other words, the address fields 40,42 do not provide unique physical addresses for service modules 18, 20, 22, but rather indexes to logical addresses in an address table, represented in FIG. 1 by reference numeral 43. In this manner, platform-dependent physical addressing is handled by the system communication mechanism.

The common set of commands preferably is relatively small and consistent across all service modules. The command set may include set, get, let, and restore commands that operate on parameters, start and stop commands that govern modes of action, a data command for transporting data, and an event command for reporting events. Thus, a subset of the commands is operative with respect to the parameters to define one of the computer telephony services to be performed by one of the resources. The parameters, modes, and data types may vary from service module to service module, but the set of commands for controlling them is the same. In this manner, packets can be made and consumed on different platforms, but interpreted identically.

Figure 3:
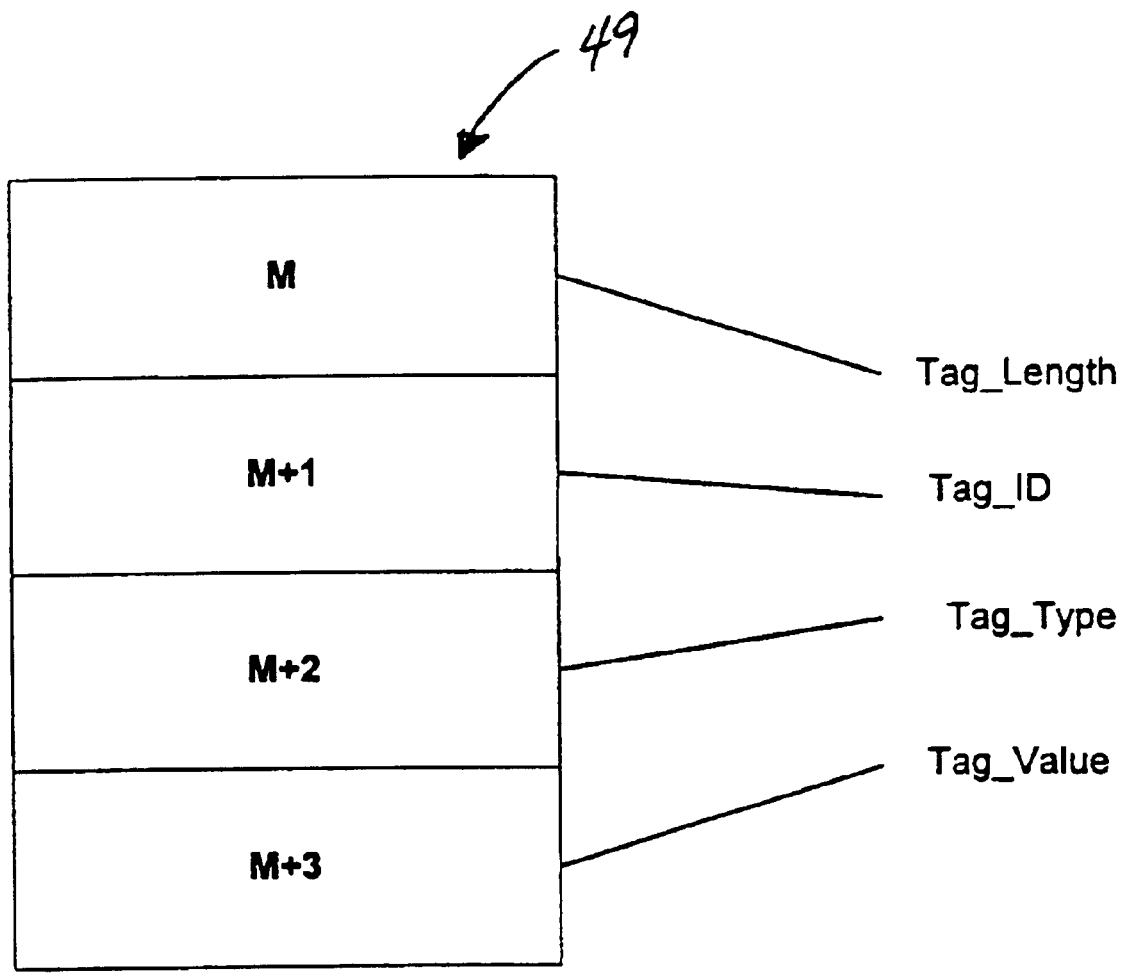
FIG. 3 is a diagram illustrating a command with tagged values.

The set, get, let, event, restore, start, stop, and data commands preferably use "tagged" values for the parameters, modes, and data. In other words, the type and name of each parameter is clearly stated in the message packet, and not dependent on order. As a result, modification and porting of a service module 18, 20, 22 to other platforms is made easier. FIG. 3 is a diagram illustrating the form an exemplary command 49 with tagged values. As shown in FIG. 3, each tagged-value command may include a Tag_Length, Tag_ID, Tag_Type, and Tag_Value fields. The Tag_Data, Tag_ID, and Tag_Type fields may be extensible. If the high bit of such fields is set, another byte or word follows. Tag_Length generally denotes a byte length. Data commands may contain stream data.

With further reference to FIG. 1, each of intra-platform packet routers 24 is implemented by a platform 12, 14, 16 as a software process running on the host processor. Each router 24 is coded once for all platforms 12, 14, 16 in a portable programming language, and according to a platform-independent protocol. An intra-platform packet router 24 routes the abstract, platform-independent message packets to and from appropriate service modules 18, 20, 22. Specifically, an intra-platform packet router 24 is configured to receive message packets and route them between service modules 18, 20, 22 based on the destination address in the packet. An intra-platform packet router 24 receives message packets from service modules on the same platform on which the intra-platform router resides via outgoing queues 32. Alternatively, intra-platform packet router 24 receives message packets from service modules on other platforms via inter-platform router 26, which will be described in greater detail below. In either case, the message packets are addressed to service modules 18, 20, 22 associated with particular resources necessary to perform a desired computer telephony service.

If a message packet received by an intra-platform packet router 24 has an intra-platform destination address, i.e., designates one of the service modules residing on the same platform as the intra-platform packet router, the message packet is routed to the appropriate service module 18, 20, 22 on the respective platform 12, 14, 16. Specifically, intra-platform packet router 24 places the message packet on the incoming queue 30 associated with the service module 18, 20, 22. The intra-platform packet router 24 associates each message packet with a service module 18, 20, 22 by reference to the destination address in the packet and address table 43 maintained by the host processor for the respective platform 12, 14, 16. The address table 43 stores a mapping of logical addresses for the modules throughout system 10, and is replicated across platforms 12, 14, 16. The intra-platform packet router 24 maintains the state, i.e., fullness or emptiness, of queues 30, 32, and provides this information to the host processor to allow flow control of message packets.

The incoming queue 30 may be arranged to process incoming message packets in a number of ways. For example, packet router 24 may recognize priority may be given to message packets sent from particular service modules, as indicated by source address 42, or message packets requesting particular computer telephony services, as indicated by command and parameter fields 44, 46. In this case, two sets of queues may be established, one for normal priority and the other for high priority. In any event, intra-platform packet router 24 enables service modules 18, 20, 22 to receive message packets from different service modules virtually simultaneously and queue the message packets for processing. Thus, message packets received from different sources can be processed in an interleaved packet-switched manner instead of via a threaded driver that maintains a persistent link with the service module until an entire task is complete.

If a message packet received by an intra-platform packet router 24 has an inter-platform destination address, i.e., designates one of the service modules 18, 20, 22 residing on a different platform 10, 12, 14 from the one on which the intra-platform packet router resides, intra-platform packet router 24 routes the message packet to an inter-platform interface 28 defined by one of the inter-platform packet routers 26. The intra-platform packet router 24 determines that the message packet should be routed off of the platform by reference to the destination address and the address table 43 maintained by the host processor. If the address is not among the local platform addresses in the table, the message is routed to inter-platform interface 28. Each inter-platform packet router 26 is implemented as a software process running on the host processor of each platform 12, 14, 16. A set of queues (not shown) may be provided for transfer of message packets between intra-platform packet routers 24 and inter-platform packet router 26. An inter-platform packet router 26 selects another inter-platform packet router on another platform 12, 14, 16, by reference to the destination address of the message packet to be routed, and the address table 43 maintained by the host processor.

The intra- and inter-platform packet routers 24, 26 are divided into separate modules for purposes of modularity. Thus, if the network communication protocol is changed for system 10, inter-platform router 26 can be replaced without disturbing intra-platform router 24 on each platform. Routers 24, 26 could be integrated, however, to provide a single router for both intra- and inter-platform packet routing.

The destination address 40 may identify a service module by an address scheme that is non-hierarchical. For example, the destination address 40 sets forth a host subfield that identifies a platform, a resource subfield that identifies a resource, a channel subfield that identifies one of the processing channels associated with a resource, and/or a service module subfield that identifies a service module. Thus, by reference to the host subfield of an inter-platform message packet and the address table 43, an inter-platform packet router 26 can identify another inter-platform packet router to handle the packet. Upon receiving the message packet off of the incoming queue, the inter-platform packet router 26 routes the message packet to intra-platform router 24 residing on the same platform 12, 14, 16. The intra-platform packet router 24 then sends the message packet to the appropriate service module 18, 20, 22 by reference to the destination address in the message packet, which may include the service module subfield, and the address table 43 maintained by the host processor for the respective platform. Although it is not necessary, the incorporation of redundant paths to resources may be desirable. In this case, inter-platform routers 26 can be configured to perform load balancing of message packets across such paths. To preserve temporal ordering of message packets without significant post-receipt reordering, however, it may be desirable that packet routers 26 not transmit consecutive packets along separate paths. In this manner, receipt of consecutive packets in the wrong temporal order due to transmission delays can be avoided.

Figure 4:
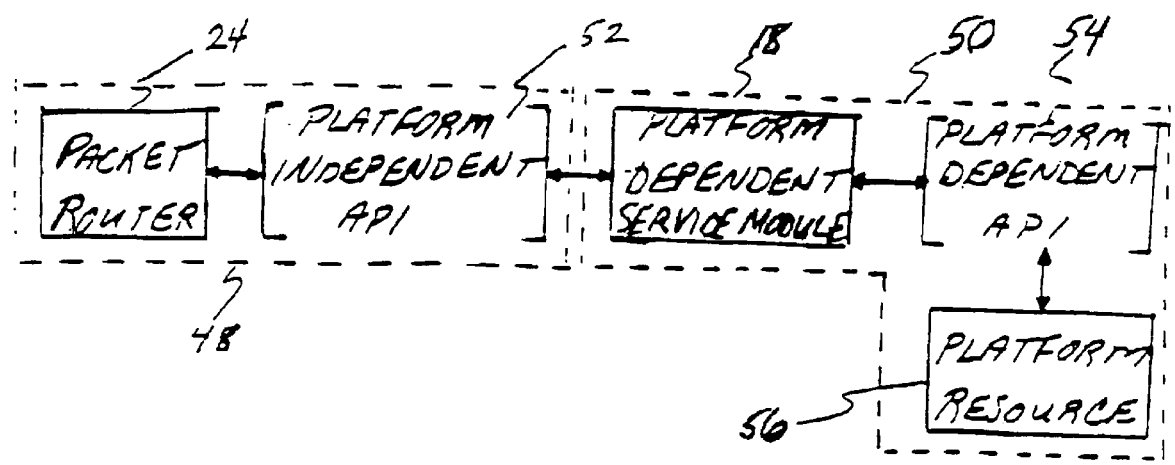
FIG. 4 is a functional block diagram of a platform interface structure for the system of FIG. 1.

FIG. 4 is a functional block diagram of a platform interface structure for the system of FIG. 1. The structure is divided into a platform-independent component 48 and a platform-dependent component 50. As shown in FIG. 4, the platform interface structure includes a platform-independent application program interface (API) 52 and a platform-dependent API 54. The platform-independent API 52 defines the logical interface for communication between intra-platform packet router 24 and a service module 18. The local, platform-dependent API 54 defines the logical interface for communication between a service module 18 and an associated resource indicated by block 56. A service module 18, via platform-independent API 52 and platform-dependent API 54, maps the generic driver logic communicated across the diverse platforms by the message packets to the local driver logic necessary for application, system, and/or hardware access to a particular resource. In this manner, service module 18 provides a transparent logical interface that isolates the platform-independent packet router 24 from a particular resource 56, masking internal organization and functions of the resource. As a result, cross-platform portability of the intra-platform packet router 24 is maintained, enabling intra-platform communication according to simplified, generic drivers. One exception to the concepts of isolation and transparency arises in the organization of the message packet buffers that are passed among the service modules 18, 20, 22. Specifically, for services that require fast processing, communication of message packets may, in some cases, induce undue processing delays. Thus, as an exception for certain services, service modules 18, 20, 22 may be configured to exchange message packet buffers without the need for communication via routers 24, 26.

To achieve the interface structure represented in FIG. 4, each service module 18, 20, 22 is coded for the particular platform on which it resides. Thus, significant redevelopment for new resources is necessary only at the service module level, whereas intra-platform packet routers 24 are coded once for all platforms according to the platform-independent message packet protocol. Each service module 18, 20, 22 services the API of the local platform by mapping the local API to and from the platform-independent API. Only service modules 18, 20, 22 service or issue commands relative to functions defined by the local, platform-dependent API for a resource. At the same time, service modules 18, 20, 22 issue or service commands relative to functions defined by the platform-independent API as required. When a service module requests a service, it issues a function call to the platform-independent API in the form of a message packet. The intra-platform packet router 24 routes the message packet, as appropriate, to another service module 18, 20, 22 on the same platform or to another platform, via inter-platform packet router 26, depending on the location of the required resource. When a message packet requesting a service is received, the service module 18, 20, 22 implements the function by a function call to the platform-dependent API.

Unlike service modules 18, 20, 22, intra-platform packet router 24 is coded for use on all system platforms 12, 14, 16 and is the platform-independent component of the architecture. The intra-platform packet router 24 services only the generic logic conveyed by the message packets and, in general, manipulates abstract, platform-independent objects such as the message packets, messages, message buffers, platform addresses, and service module addresses. Thus, the intra-platform packet router 24 is extremely portable and robust, allowing the addition of new platforms without significant redevelopment of the routers. To facilitate portability, intra-platform packet router 24 preferably is coded in the C programming language or other similarly portable language.

The intra-platform packet router 24 obtains platform-dependent services by issuing function calls defined by the platform-independent API to appropriate service modules 18, 20, 22. The intra-platform packet router 24 updates all routing information in the address table 43 maintained by the host processor. The address table 43 maps platform and module addresses to an appropriate access session. The intra-platform packet router 24 creates an access session for each communication between a service module and a resource. Using address table 43, the intra-platform packet router 24 routes all inbound and outbound message packets to the access session for the appropriate service modules 18, 20, 22. Aside from platform-dependent services provided by service modules 18, 20, 22, intra-platform packet router 24 can be coded so that system dependencies are serviced by the runtime libraries of the local platform. For example, the intra-platform packet router 24 can be coded to use generic C programming functions for system dependent operations such as memory allocation and common file I/O. If minor system differences arise between platforms 12, 14, 16, but do not require a function call to service modules 18, 20, 22, such system dependencies can be handled through compiler #IFDEF statements or similar ad hoc declarations of system dependent logic and syntax.

Figure 5:
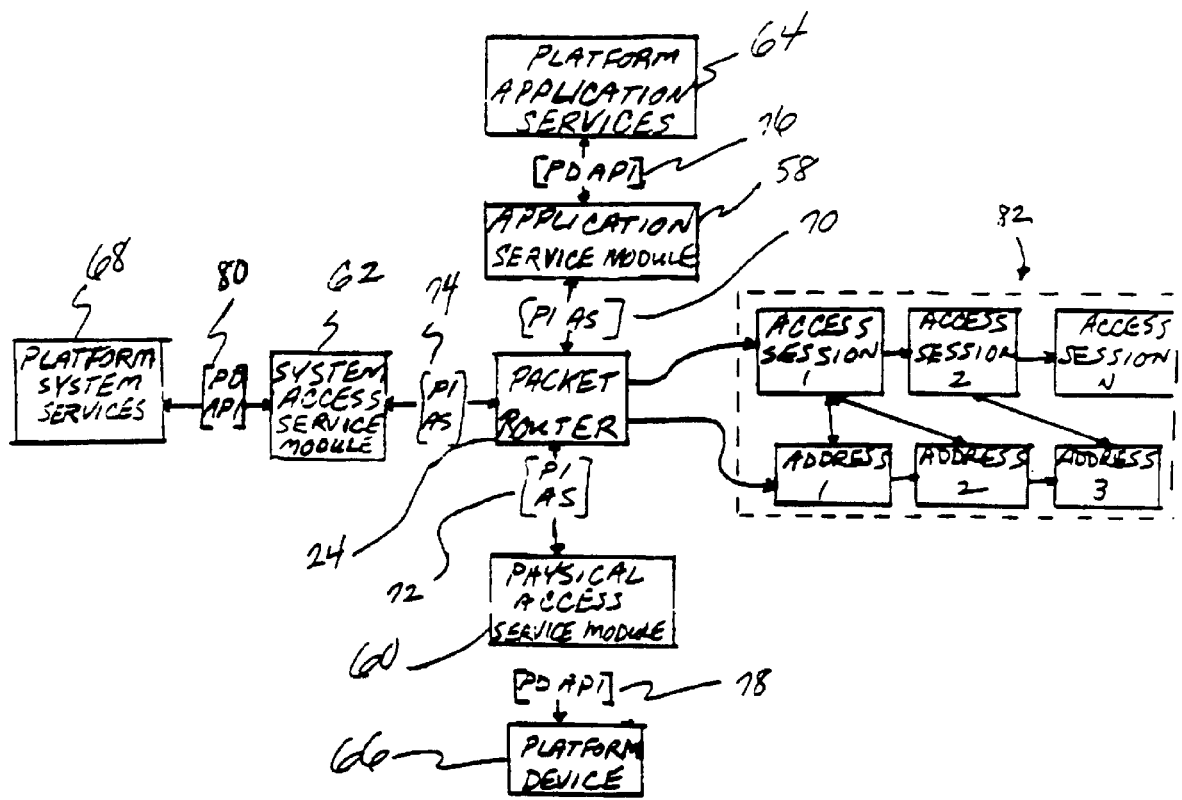
FIG. 5 is a functional block diagram of a platform interface structure for application, system, and physical access services for the system of FIG. 1.

FIG. 5 is a functional block diagram of a platform interface structure for application, system, and physical access services for the system of FIG. 1. Although service modules 18, 20, 22 are represented throughout this description as a single-type of module in operation, each service module can be divided into three module categories. Specifically, as shown in FIG. 5, service modules 18, 20, 22 may comprise an application access service module 58, a physical access service module 60, or a system access service module 62. The application access service module 58 services the logical interface to host application services 64 residing on the platform 12, 14, 16 as computer telephony resources. For example, an application access service module 58 may drive a fax modem application. The physical access service module 60 services physical access to the hardware devices 66 supported by the platform. The system access service module 62 services the logical interface to operating system services 68. The service modules 58, 60, 62 define platform-independent access sessions 70, 72, 74 and platform-dependent APIs 76, 78, 80 that map platform-independent logic conveyed by the message packets to the platform-dependent logic defined by the local platform.

With further reference to FIG. 5, all components that send or receive message packets, including service modules 58, 60, 62 and packet routers 24 themselves, establish access sessions 70, 72, 74 with the local intra-platform packet router. An access session 70, 72, 74 encapsulates a message queue, a session free message buffer pool, and a set of events and states necessary to support the service modules sending and receiving message packets via the access session. An access session 70, 72, 74 resides in the intra-platform packet router 24 and is controlled by the platform-independent API calls to and from a service module 58, 60, 62 and the packet router itself When a service module 58, 60, 62 creates an access session with the intra-platform packet router 24, the service module designates via the message packet a destination address or addresses to be serviced by the access session 70, 72, 74. The intra-platform packet router 24 updates the address table 43 and records the destination address or addresses, as well as the supporting access session as indicated by block 82.

The service modules 58, 60, 62 associated with an access session 70, 72, 74 define the message processing logic for the access session. An access session may be configured such that: (a) a particular destination address is supported by only one access session at a time, (b) an access session supports more than one destination address at a time, (c) an access session has a single inbound message queue for all of its supported destination addresses, and (d) the packet router 24 creating the access session defines the server logic for the access session functions called by the packet router, including the inbound message queue server. Destination addresses routed to a device 66 are supported by access sessions 72 created by physical access service modules 60. Similarly, destination addresses routed to host applications 64 are supported by access sessions 70 created by application access service modules 58. Finally, destination addresses routed to system resources 68 are supported by access sessions 74 created by system access service modules 62. For destination addresses routed to remote, i.e, inter-platform, host applications, system access sessions are created through application access service modules 58 by network access applications.

When an intra-platform packet router 24 receives a message packet, from any source, the packet router locates a supporting access session 70, 72, 74 by reference to the address table 43 maintained by the host processor. If a supporting access session 70, 72, 74 is located in the address table 43, the packet router 24 places the message packet in the inbound message queue for the supporting access session. The queue eventually passes the message packet to the service module 58, 60, 62 associated with the access session. If a supporting access session cannot be located, however, the message packet is returned to the source address with an error message.

In addition to the standard C function libraries available on each platform 12, 14, 16, a component utility library may be provided on each platform. The component utility library includes a platform-independent API to a variety of general purpose functions. The general purpose functions can be linked to any service module 18, 20, 22 on a platform 12, 14, 16 to provide common services including object management, memory management, list management, buffer management, message management, message queue management, session management, and configuration management.

A number of embodiments of the present invention have been described. Nevertheless, it will be understood that various modifications may be made without departing from the spirit and scope of the invention. Accordingly, other embodiments are within the scope of the following claims.

What is claimed is:

1. A computer telephony system comprising:
   computer telephony platforms having resources that provide computer telephony services;
   service modules residing on each of the platforms, wherein the service modules manipulate the resources according to platform-dependent protocols to facilitate performance of the computer telephony services for other service modules, and communication among the service modules uses message packets having a common, platform-independent protocol, each of the message packets including one of a common set of commands and one of a set of parameters, each of the commands being operative with respect to one of the parameters to define one of the computer telephony services to be provided by one of the resources;
   intra-platform packet routers residing on the platforms and configured to route message packets having intra-platform destination addresses to local service modules, including message packets originating from a platform on which an intra-platform packet router resides and having an intra-platform destination address to a service module residing on the platform, and route message packets having inter-platform destination addresses to an inter-platform interface; and an inter-platform packet router associated with the inter-platform interface, the inter-platform router routing message packets having inter-platform destination addresses received from the intra-platform routers to one of the intra-platform routers residing on one of the platforms on which the service modules indicated by the inter-platform address reside.

2. The computer telephony system of claim 1, wherein each of the message packets includes a source address indicating an address of one of the service modules originating the message packet, and a destination address indicating the address of the service modules to receive the message packet.

3. The computer telephony system of claim 1, wherein each of the resources comprises one of a hardware device and a software object.

4. The computer telephony system of claim 1, wherein the computer telephony services include voice, facsimile, data messaging video, and multi-media services.

5. The computer telephony system of claim 1, wherein each of the service modules maintains a queue for receipt of the message packets, the queue defining an order of processing of the message packets by the service module, wherein each of the service modules is capable of processing message packets received from a plurality of the other service modules in an interleaved manner.

6. A computer telephony system comprising:

service modules configured to manipulate resources to facilitate the performance of computer telephony services for other service modules, wherein communication among the service modules uses message packets having a common protocol, each of the message packets includes one of a common set of commands and one of a plurality of parameters, each of the commands is operative with respect to one of the parameters to define one of the computer telephony services, and each of the service modules manipulates one of the resources according to one of a plurality of diverse protocols; and a packet router configured to route the message packets to the service modules based on a destination address included in the message packet.

7. The computer telephony system of claim 6, wherein each of the message packets includes a source address indicating an address of the service module originating the message packet, the destination address indicating the address of the service module to receive the message packet, a command field including one of a set of commands common to each of the message packets, and a parameter field including one of a set of parameters, wherein each of the commands is operative with respect to one of the parameters to define one of the computer telephony services.

8. The computer telephony system of claim 6, wherein each of the resources comprises one of a hardware and a software object.

9. The computer telephony system of claim 6, wherein each of the service modules maintains a queue for receipt of the message packets, the queue defining an order of processing of the message packets by the service module, wherein each of the service modules is capable of processing message packets received from the other service modules in an interleaved manner.

10. The computer telephony system of claim 6, wherein the computer telephony services include voice, facsimile, data messaging, video, and multimedia services.

11. A computer telephony system comprising;

computer telephony platforms; and service modules residing on the platforms, one of the service modules accessing resources on the platform according to one of a plurality of platform-dependent protocols to facilitate performance of computer telephony services for other service modules, wherein communication among the service modules uses message packets communicated according to a common, platform-independent protocol, of the message packets includes one of a common set of commands and one of a set of parameters, and each of the commands is operative with respect to one of the parameters to define one of the computer telephony services.

12. The computer telephony system of claim 11, wherein each of the message packets includes a source address indicating an address of one of the service modules originating the message packet, the destination address indicating the address of one of the service modules to receive the message packet, a command field including one of a set of commands common to each of the message packets, and a parameter field including one of a set of parameters, wherein each of the commands is operative with respect to one of the parameters to define one of the computer telephony services.

13. The computer telephony system of claim 11, wherein each of the resources comprises one of a hardware device and a software object.

14. The computer telephony system of claim 11, wherein each of the service modules maintains a queue for receipt of the message packets, the queue defining an order of processing of the message packets by the service module, wherein each of the service modules is capable of processing message packets received from the other service modules in an interleaved manner.

15. The computer telephony system of claim 11, wherein each of the service modules accesses the resources according to one of a plurality of platform-dependent protocols.

16. The computer telephony system of claim 11, wherein the computer telephony services include voice, facsimile, data messaging, video, and multi-media services.

17. A method for multi-platform communication in a computer telephony system having a plurality of computer telephony platforms providing resources, wherein the resources facilitate the performance of computer telephony services, and service modules residing on the platforms configured to manipulate the resources according to one of a plurality of platform-dependent protocols to perform the computer telephony services for other service modules, the method comprising;

communicating information between each of the service modules via message packets having a common platform-independent protocol, each of the message packets including a destination address indicating one of the service modules to receive the message packet each of the message packets including one of a common set of commands and one of a set of parameters, each of the commands being operative with respect to one of the parameters to define one of the computer telephony services;

routing each of the message packets having an intra-platform address to an appropriate service module on the platform; and routing each of the message packets having inter-platform addresses to one of the platforms on which the service modules indicated by the inter-platform address reside.

18. The method of claim 17, wherein each of the message packets includes a source address indicating an address of one of the service modules originating the message packet, the destination address indicating the address of the service modules to receive the message packet, a command field including one of a set of commands common to each of the message packets, and a parameter field including one of a set of parameters, wherein each of the commands is operative with respect to one of the parameters to define one of the computer telephony services.

19. The method of claim 17, wherein each of the resources comprises one of a hardware device and a software object.

20. The method of claim 17, wherein the computer telephony services include voice, facsimile, data messaging, video, and multi-media services.

21. A service module for use in a computer telephony system having a plurality of computer telephony platforms, the service module comprising;
   means for manipulating a resource residing on one of the platforms according to one of a plurality of platform-dependent protocols to facilitate performance of a computer telephony service by the resource for another service module; and
   means for communicating with other service modules via message packets having a common, platform-independent protocol, each of the message packets including a destination address indicating one of the service modules to receive the message, each of the message packets including one of a common set of commands and one of a plurality of parameters, the commands being operative with respect to one of the parameters to define one of the computer telephony services to be performed by one of the resources.

22. The service module of claim 21, wherein each of the message packets includes a source address indicating an address of the service module originating the message packet, the destination address indicating the address of the service module to receive the message packet, a command field including one of a set of commands common to each of the message packets, and a parameter field including one of a set of parameters, wherein each of the commands is operative with respect to one of the parameters to define the computer telephony service to be performed by the resource.

23. The service module of claim 21, wherein the computer telephony services include voice, facsimile, data messaging, video, and multi-media services.

24. The service module of claim 21, wherein service module maintains a queue for receipt of the message packets, the queue defining an order of processing of the message packets by the service module, wherein the service module is capable of processing message packets received from the other service modules in an interleaved manner.

25. A method for communicating service request among service modules in a computer telephony system having a plurality of computer telephony platforms, wherein each of the computer telephony platforms provides a resource that performs a computer telephony service, the method comprising:
   communicating service requests among the service modules according to a common, platform-independent protocol, each of the service modules communicating service requests to the other service modules via message packets having the common, platform-independent protocol each of the message packets including on of a common set of commands and one or more of a plurality of parameters, each of the commands being operative with respect to one of the parameters to define the computer telephony services to be performed by the resources; and
   controlling each of the service modules with the service requests to manipulate the resources according to one of a plurality of platform-dependent protocols to facilitate performance of the computer telephony services.

26. The method of claim 25, further comprising routing each of the message packets having an intra-platform destination address to one of the service modules on the platform, and routing the message packets having inter-platform destination addresses received from each of the intra-platform routers to one of the service modules on one of the platforms indicated by the inter-platform destination address.

27. The method of claim 25, wherein each of the message packets includes a source address indicating an address of one of the service modules originating the message packet, and a destination address indicating the address of one of the service modules to receive the message packet.

28. The method of claim 25, wherein each of the resources comprises one of a hardware device and a software object.

29. The method of claim 25, wherein the computer telephony services include voice, facsimile, data messaging video, and multi-media services.

30. The method of claim 25, further comprising queuing the message packets to define an order of processing of the message packets by the service modules, wherein each of the service modules is capable of processing message packets received from a plurality of the other service modules in an interleaved manner.

* * * * *